US006283904B1

(12) United States Patent
Itoh et al.

(10) Patent No.: US 6,283,904 B1
(45) Date of Patent: Sep. 4, 2001

(54) CONDUCTIVE ROLL

(75) Inventors: Masahiko Itoh; Wataru Imamura, both of Inuyama; Tetsuya Itoh, Komaki, all of (JP)

(73) Assignee: Tokai Rubber Industries, ltd., Komaki (JP)

( * ) Notice: Subject to any disclaimer, the term of this patent is extended or adjusted under 35 U.S.C. 154(b) by 0 days.

(21) Appl. No.: 09/535,530

(22) Filed: Mar. 27, 2000

(30) Foreign Application Priority Data

Mar. 25, 1999 (JP) ........................................ 11-081522

(51) Int. Cl.$^7$ ........................................ F16C 13/00
(52) U.S. Cl. ........................................ 492/56; 399/176
(58) Field of Search ........................................ 492/56, 59, 18; 399/176, 174, 313

(56) References Cited

U.S. PATENT DOCUMENTS 5,312,662 * 5/1994 Ohta et al. .......................... 428/36.8
5,567,494 * 10/1996 Ageishi et al. .......................... 428/36.9
5,604,031 * 2/1997 Yamamoto et al. .......................... 428/335
5,822,658 * 10/1998 Tanaka et al. .......................... 399/174
6,190,295 * 2/2001 Kawano et al. .......................... 492/56

FOREIGN PATENT DOCUMENTS

4426627 A1 * 2/1995 (DE) .
19709627 A1 * 9/1998 (DE) .
7-134472 5/1995 (JP) .......................... G03G/15/02
8-73660 3/1996 (JP) .......................... C08L/9/02

* cited by examiner

*Primary Examiner*—S. Thomas Hughes
*Assistant Examiner*—Marc W. Butler
(74) *Attorney, Agent, or Firm*—Jacobson Holman, PLLC

(57) ABSTRACT

A conductive roll sequentially has a conductive layer of an elastic material, a resistance adjusting layer, and a protective layer which are formed on an outer periphery of a shaft. The resistance adjusting layer is formed from a composition containing 10 to 150 parts by weight of an electron conductive agent, not more than two parts by weight of an ion conductive agent and 20 to 80 parts by weight of an insulating filler, relative to 100 parts by weight of nitrile rubber, or nitrile rubber hydride as a base material. The roll has a properly controlled environment dependence of its electric resistance, and avoids any trouble, such as enlarged picture defects, when employed in an electrophotographic process.

20 Claims, 2 Drawing Sheets

CONDUCTIVE ROLL

BACKGROUND OF THE INVENTION

1. Field of the Invention

This invention relates to a conductive roll, such as a charge roll. This invention is suitable for use in, for example, a copying machine, or printer in which an electrophotographic process is employed.

2. Description of the Related Art

There is known a conductive roll having, for example, a conductive layer of an elastic material, a resistance adjusting layer and a protective layer which are formed on the outer periphery of a shaft in the order mentioned. The conductive layer is generally intended for, for example, imparting electric conductivity to the roll, enabling the roll to make intimate contact with a photosensitive drum and preventing any resonance noise from being made between the roll and the photosensitive drum upon application of an AC voltage. The resistance adjusting layer is generally intended for, for example, adjusting the electric resistance of the whole roll and improving its resistance to leak. The protective layer is generally intended for, for example, preventing the adherence of any toner to the roll surface and the contamination of the photosensitive drum by bleeding or blooming from the inside of the roll. An electron conductive agent, such as carbon black, or an ion conductive agent, such as a conjugated system polymer, has so far properly been employed, if necessary, in the resistance adjusting layer for imparting electric conductivity to it, or adjusting its electric resistance.

SUMMARY OF THE INVENTION

The electric resistance which is determined by an ion conductive agent depends on its electron traverse speed. The electron traverse speed is high at a high temperature and a high humidity (while bringing about a low resistance), and low at a low temperature and a low humidity (while bringing about a high resistance). It has, therefore, been a drawback of a resistance adjusting layer containing an ion conductive agent that its electric resistance varies greatly according to its environment, thereby causing a variation in the density of an image produced.

On the other hand, it has been a drawback of a resistance adjusting layer containing an electron conductive agent that its electric resistance depends on its working history, or the conditions of its extrusion molding, such as the extruding temperature, thereby bringing about an image density lacking stability.

In order to solve these problems, the present inventors have paid attention to a number of points as stated below. An electron conductive agent, such as carbon black, has an enlarged or reduced distance between its particles according to an increase or decrease in volume of its matrix which depends on temperature. Therefore, it tends to show a high electric resistance at a high temperature and a high humidity and a low electric resistance at a low temperature and a low humidity, as opposed to an ion conductive agent.

It has, however, been found that the dependence of a resistance adjusting layer upon its environment as stated above can be controlled effectively if it contains both an electron conductive agent and an ion conductive agent in appropriate proportions. It has also been found that, if such is the case, the dependence of its electric resistance upon its working history can be effectively controlled, too.

It has further been found that the incorporation of insulating particles conforming to certain conditions in a resistance adjusting layer makes it possible to prevent the cohesion of its electron conductive agent and control the dependence of its electric resistance upon its working history still more effectively. It has also been found that the incorporation of insulating particles makes it possible to prevent any increase or enlargement of picture defects (e.g. due to defects of a drum in a copying machine) and give a greatly improved surface to the resistance adjusting layer.

Thus, this invention resides in a conductive roll comprising a conductive layer of an elastic material, a resistance adjusting layer and a protective layer which are formed on the outer periphery of a shaft in the order mentioned, wherein the resistance adjusting layer is formed from a composition containing 10 to 150 parts by weight of an electron conductive agent, not more than two parts by weight of an ion conductive agent and 20 to 80 parts by weight of an insulating filler, relative to 100 parts by weight of nitrile rubber, or nitrile rubber hydride as a base material.

According to this invention, the resistance adjusting layer contains both an electron conductive agent and an ion conductive agent in optimum proportions. Therefore, the resistance adjusting layer shows a stable electric resistance in an environment having from a low temperature of, say, 10° C. and a low humidity of, say, 10% to a high temperature of, say, 30° C. and a high humidity of, say, 90%. Thus, the dependence of its electric resistance upon its environment can be greatly lowered. Moreover, the resistance adjusting layer has an effectively controlled dependence of its electric resistance upon its working history.

Any proportion of the electron conductive agent below 10 parts by weight is undesirable, since no sufficient effect can be obtained from its incorporation. Any proportion thereof exceeding 150 parts by weight is also undesirable, since the resistance adjusting layer becomes less easy to process and the electron conductive agent becomes lower in dispersibility. Any proportion of the ion conductive agent exceeding two parts by weight is also undesirable, since it separates in an environment having a high temperature and a high humidity.

According to this invention, the resistance adjusting layer contains also an insulating filler in a certain range of parts by weight. It makes the cohesion of the electron conductive agent, such as carbon black, less likely to occur, and makes it possible to prevent effectively any drop in electric resistance of the resistance adjusting layer. Therefore, it is possible to prevent effectively any trouble caused by electric shortcircuiting, such as enlarged picture defects, when the photosensitive drum has a chipped or broken portion. Moreover, the filler gives a smooth surface to the resistance adjusting layer, and thereby makes it possible to prevent the contamination of the roll surface.

Referring to the proportion of the insulating filler, its range which is effective for preventing the cohesion of the electron conductive agent does not necessarily coincide with its range which is effective for giving a smooth surface to the resistance adjusting layer. Its proportion as employed for defining this invention is, therefore, defined by a broader range covering from the lowermost proportion in one of the two ranges to the uppermost proportion of the other range, thus including a proportion which is effective for at least one of those two purposes.

The above and other advantages of the invention will become more apparent in the following description and the accompanying drawings.

DETAILED DESCRIPTION OF THE INVENTION

According to a first aspect of this invention, a conductive roll has a resistance adjusting layer containing more than one, but not more than two parts by weight of an ion conductive agent relative to 100 parts by weight of a base material of the layer. According to this first aspect, the ion conductive agent exhibits its outstanding effectiveness. Although no definite reason is known as yet, it is possible that the proportion of the ion conductive agent exceeding one part by weight may allow it to have a still better balance in quantity with the electron conductive agent.

According to a second aspect of this invention, a conductive roll has a resistance adjusting layer containing 30 to 75 parts by weight of an insulating filler relative to 100 parts by weight of a base material of the layer. This range covers only the overlapping portions of a range of proportions in which the filler is effective for preventing the cohesion of the electron conductive agent, and a range in which it is effective for giving a smooth surface to the resistance adjusting layer. The second aspect, therefore, makes it possible to achieve both of the above two purposes effectively.

According to a third aspect of this invention, a resistance adjusting layer contains two or more kinds of differently shaped inorganic insulating fillers. It may, for example, contain two or more kinds of materials selected from among spherical or bulk silica, flaky mica and an inorganic material in whisker form. These combinations are particularly effective for preventing the cohesion of the electron conductive agent and giving a smooth surface to the resistance adjusting layer, though no definite reason is known as yet.

According to a fourth aspect of this invention, a conductive roll has a protective layer formed from a resin composition containing a fluoroacrylic resin. This fact makes the contamination of the roll by a toner less likely to occur.

According to a fifth aspect of this invention, a conductive roll has a protective layer containing graft carbon obtained by grafting a polymer to the surfaces of carbon black. This aspect is effective for preventing the cohesion of carbon black in the protective layer. Thus, this aspect, in addition to the insulating filler in the resistance adjusting layer as described above, serves to prevent any trouble caused by electric shortcircuiting, such as enlarged picture defects, when the photosensitive drum has a chipped or broken portion.

Description will now be made of a conductive roll in further detail.

Figure 1:
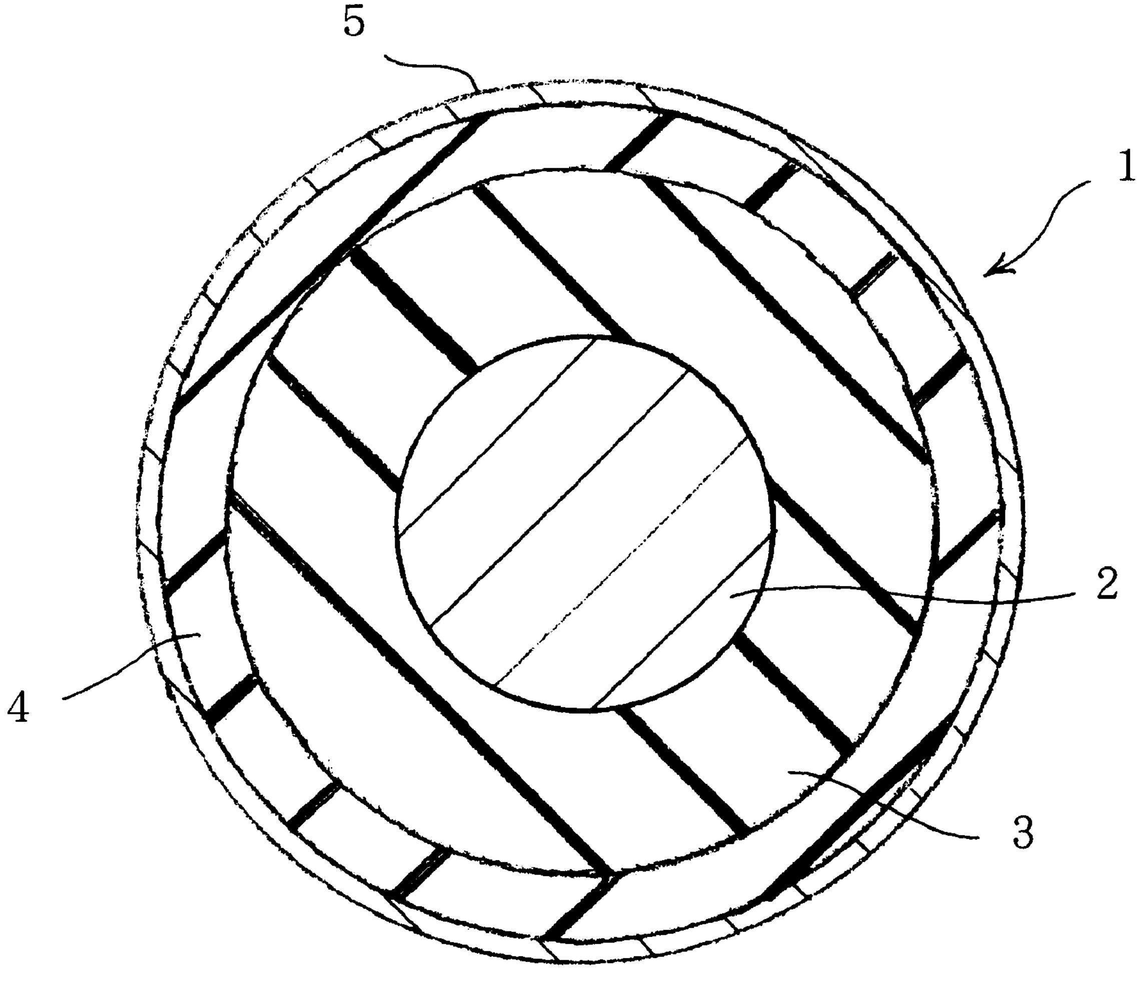
FIG. 1 is a cross sectional view of a conductive roll embodying this invention.

A conductive roll 1 shown in FIG. 1 as an example has a conductive layer 3 of an elastic material, a resistance adjusting layer 4 and a protective layer 5 which are formed on the outer periphery of a metal shaft 2 in the order mentioned. The conductive roll 1 is suitable for use in, for example, a copying machine, or printer in which an electrophotographic process is employed, and it is particularly useful as a charge roll used for charging a photosensitive drum.

Each layer of the conductive roll 1 may have a thickness as considered appropriate. The conductive layer 3 may, for example, have a thickness of 1 to 10 mm (preferably, say, 2 to 4 mm). The resistance adjusting layer 4 may have a thickness of 10 to 700 $\mu$m(preferably, say, 80 to 600 $\mu$m). The protective layer 5 may have a thickness of 3 to 15 $\mu$m (preferably 5 to 12 $\mu$m).

The conductive roll 1 may be manufactured by any known process. For example, the conductive layer 3 of an elastic material and the resistance adjusting layer 4 may first be formed on the outer periphery of the shaft 2 in the order mentioned by mold forming or extrusion molding. The protective layer 5 may be formed by, for example, dipping.

Description will now be made of the conductive layer of an elastic material in further detail. The conductive layer of an elastic material in the roll of this invention is formed from a conductive elastic material obtained by mixing any known elastic material with any known conductive agent.

The elastic material is preferably a foamed material, though it may alternatively be a solid unfoamed material. Typical examples of the elastic material include an ethylene-propylene-diene terpolymer, styrene-butadiene rubber, natural rubber and polynorbornene rubber, among other kinds of rubber, and mixtures of two or more thereof, though other materials can also be used.

An electron conductive agent, such as carbon black or a metal powder, is usually preferred for use as the conductive agent. It is also possible to add any other kind of agent, such as a known vulcanizing agent, vulcanization assistant, or process oil, to the elastic material, if required.

Description will now be made of the resistance adjusting layer in further detail. A solid unfoamed material is preferably used as a base material for the resistance adjusting layer, though a foamed material can also be used. Nitrile rubber, or nitrile rubber hydride is preferably used as the base material, though other materials can also be used for the base.

Nitrile rubber, or nitrile rubber hydride has an electric resistance which is higher than that of, for example, epichlorohydrin rubber, or an epichlorohydrin-ethylene oxide copolymer which has hitherto been used for forming a resistance adjusting layer. Therefore, it is possible to avoid any excessive drop in electric resistance of the layer, even if it may contain carbon black as a conductive filler.

Nitrile rubber, or nitrile rubber hydride, which is used as the base material, is mixed with carbon black as an electron conductive agent, an ion conductive agent and an insulating filler. Carbon black is preferably employed in the proportion of 10 to 150 parts by weight relative to 100 parts by weight of nitrile rubber, or nitrile rubber hydride. Although a variety of types of carbon black can be used, it is preferable to use one having a small structure with an absorption of dibutylphthalate not more than 50 ml/100 g, since it does not cause a very sharp drop in electric resistance per unit amount employed. Examples of preferred types of carbon black are carbon black having a FT (fine thermal) or MT (medium thermal) grade, and colored carbon black used for coloring.

The ion conductive agent is preferably employed in the proportion not exceeding two parts by weight, and more preferably exceeding one part, but not more than two parts by weight relative to 100 parts by weight of nitrile rubber, or nitrile rubber hydride. Preferred examples of the ion conductive agent are quaternary ammonium salts, such as trimethyloctadecyl ammonium perchlorate and benzyltrimethyl ammonium chloride, though other substances can also be used as such.

The insulating filler is preferably employed in the proportion of 20 to 80 parts, or more preferably 30 to 75 parts by weight relative to 100 parts by weight of nitrile rubber, or nitrile rubber hydride. No limitation is made to the insulating filler to be used for the purpose of this invention, or its particle shape. It is, however, particularly preferable to use two or more kinds of differently shaped inorganic fillers together. Preferred examples of the inorganic fillers are silicic acids and silicates. Spherical or bulk silica and flaky mica are preferred examples of inorganic fillers having various particle shapes.

Description will now be made of the protective layer in further detail. The protective layer is usually formed from a resinous material. Examples of the resinous material are a fluoroacrylic resin, a polyamide resin, an acrylic resin and a fluororesin, though other kinds of resins can also be used. A particularly preferable protective layer is, however, formed from a resin composition containing a fluoroacrylic resin, i.e. a fluoroacrylic resin, or a mixture thereof with another kind of resin. In the event that an electron conductive agent is added to the protective layer, it is preferable to use graft carbon, so that the cohesion of carbon black may be prevented, as stated before.

EMBODIMENTS

Manufacture of Conductive Rolls

A material for forming a conductive layer of an elastic material was prepared by mixing 100 parts by weight of ethylene-propylene rubber, 10 parts by weight of carbon black, 40 parts by weight of process oil, 5 parts by weight of zinc oxide, one part by weight of sulfur, one part by weight of a thiazole type vulcanization accelerator, one part by weight of a thiuram-based vulcanization accelerator and 15 parts by weight of dinitrosopentamethylenetetramine as a foaming agent. Nitrile rubber compositions according to Examples 1 to 4 as stated below were each prepared as a material for a resistance adjusting layer.

EXAMPLE 1

A composition containing 100 parts by weight of nitrile rubber, 1.5 parts by weight of an ion conductive agent and 30 parts by weight of clay as the only insulating inorganic filler, and not containing carbon black.

EXAMPLE 2

A composition containing 100 parts by weight of nitrile rubber, 70 parts by weight of carbon black and 30 parts by weight of bulk silica as the only insulating inorganic filler, and not containing any ion conductive agent.

EXAMPLE 3

A composition containing 100 parts by weight of nitrile rubber, 70 parts by weight of carbon black, one part by weight of an ion conductive agent and two kinds of insulating inorganic fillers. The two kinds of insulating inorganic fillers were silica and mica mixed in substantially equal proportions and making a total of 60 parts by weight.

EXAMPLE 4

A composition containing 100 parts by weight of nitrile rubber, 70 parts by weight of carbon black, two parts by weight of an ion conductive agent and the same two kinds of insulating inorganic fillers as those employed in Example 3.

Then, the material for a conductive layer and each of the materials according to Examples 1 to 4 were extruded by an extruder to form a double cylindrical body. An iron shaft having a diameter of 6 mm was inserted into each cylindrical body. Each double cylindrical body holding a shaft was placed in a mold, and heated at 150° C. for 60 minutes for the foaming and vulcanization of each layer, whereby a conductive roll was obtained.

Testing of Conductive Rolls

Each conductive roll as obtained above was brought into contact with a metal roll having a diameter of 30 mm. Their contact was made in three different environments L, N and H. L means an environment of low temperature and humidity having a temperature of 10° C. and a humidity of 10%, N means an environment of normal temperature and humidity having a temperature of 20° C. and a humidity of 60%, and H means an environment of high temperature and humidity having a temperature of 30° C. and a humidity of 90%. The conductive roll was pressed against the metal roll by applying a load of 500 gf to each end of the shaft, and the electric resistance of each conductive roll was measured by applying a DC voltage of −100 V thereto.

As a result, the roll according to Example 1 showed an electric resistance of $2.1\times10^{6}\Omega$ in the environment L, $4.8\times10^{5}\Omega$ in the environment N, and $8.7\times10^{4}\Omega$ in the environment H. Thus, the roll was found to have a very high environment dependence of its electric resistance.

The roll according to Example 2 showed an electric resistance of $3.3\times10^{5}\Omega$ in the environment L, $4.8\times10^{5}\Omega$ in the environment N, and $7.3\times10^{5}\Omega$ in the environment H. Thus, the roll was found to have a considerably high environment dependence of its electric resistance.

The roll according to Example 3 showed an electric resistance of $3.8\times10^{5}\Omega$ in the environment L, $5\times10^{5}\Omega$ in the environment N, and $5\times10^{5}\Omega$ in the environment H. Thus, the roll was found to have a very low environment dependence of its electric resistance.

The roll according to Example 4 showed an electric resistance of $4.5\times10^{5}\Omega$ in the environment L, $3.1\times10^{5}\Omega$ in the environment N, and $3.1\times10^{5}\Omega$ in the environment H. Thus, the roll was found to have a very low environment dependence of its electric resistance.

Testing Resistance of Products Having Different Working Histories

The nitrile rubber compositions according to Examples 2 and 3 were each extruded to form three different resistance adjusting layers by setting the temperature of the extruder head at 80° C., 90° C. and 100° C., respectively. The electric resistance of a conductive roll including each such resistance adjusting layer was measured by repeating the method and conditions described above.

As a result, the roll having a resistance adjusting layer formed from the composition according to Example 2 by extrusion at a head temperature of 80° C. showed an electric resistance (in the environment N) of $3.1\times10^{5}\Omega$, the roll having a layer formed at a head temperature of 90° C. showed an electric resistance of $4.5\times10^{5}\Omega$, the roll having a layer formed at a head temperature of 100° C. showed an electric resistance of $2.3\times10^{5}\Omega$. Thus, the rolls having their resistance adjusting layers formed from the composition according to Example 2 were found to have a considerably high dependence of their electric resistance on their working history.

The roll having a resistance adjusting layer formed from the composition according to Example 3 by extrusion at a head temperature of 80° C. showed an electric resistance(in the environment N) of $4.8\times10^{5}\Omega$, the roll having a layer formed at a head temperature of 90° C. showed an electric resistance of $5.0\times10^{5}\Omega$, the roll having a layer formed at a head temperature of 100° C. showed an electric resistance of $4.9\times10^{5}\Omega$. Thus, the rolls having their resistance adjusting layers formed from the composition according to Example 3 hardly showed any dependence of their electric resistance on their working history.

Testing of Surface Roughness

The nitrile rubber compositions according to Examples 2 and 3 were extruded under the same conditions. The roughness of the surface of each extruded product was analyzed by a laser noncontact type displacement gauge which had been supplied by Keyence Corporation.

Figure 2:
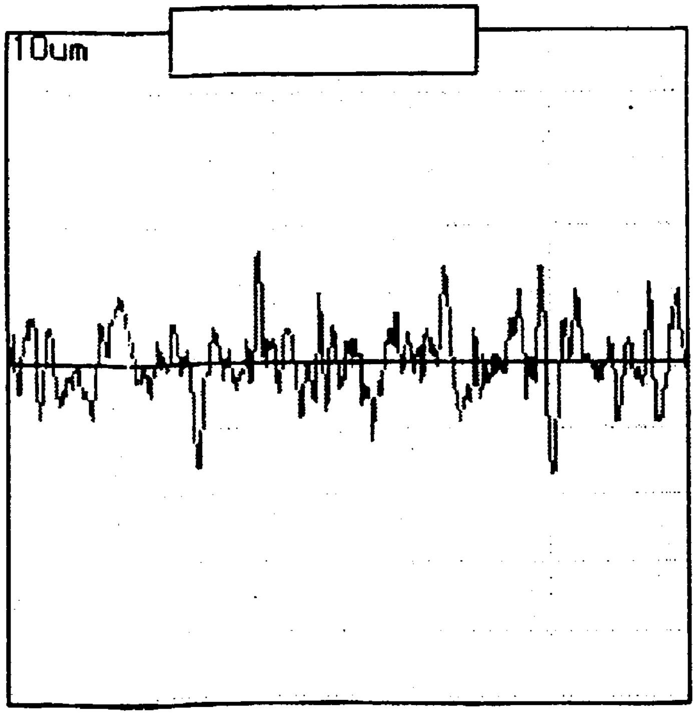
FIGS. 2 and 3 are graphs showing the surface roughness of a resistance adjusting layer according to different embodiments of this invention as analyzed by a laser noncontact type displacement gauge.
Figure 3:
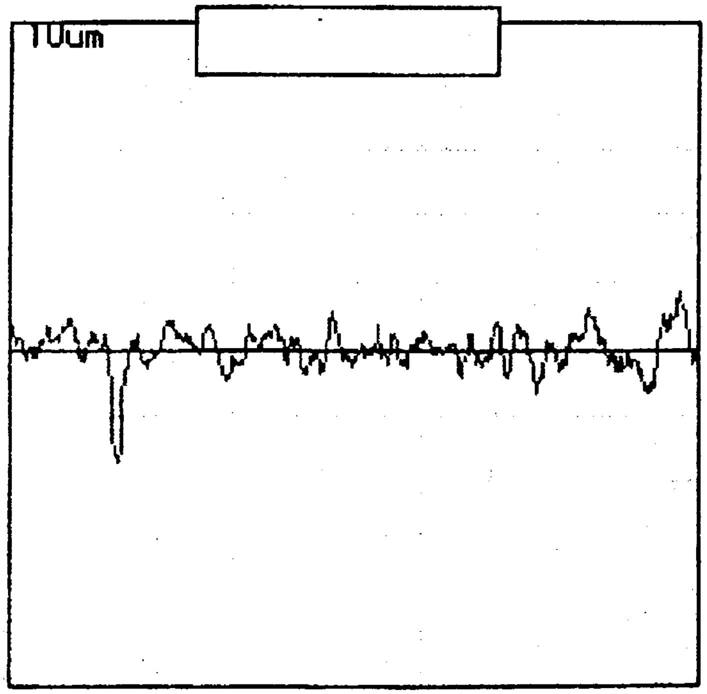

The results obtained from the products of the compositions according to Examples 2 and 3 are shown in FIGS. 2 and 3, respectively, on the same contraction scale. As is obvious from a comparison of the two graphs, the composition according to Example 3 gave a by far smoother surface than that according to Example 2. The composition according to Example 2 contained only one kind of insulating inorganic filler, while that according to Example 3 contained two kinds of insulating inorganic fillers, silica and mica, in substantially equal proportions making a total proportion equal to that of the filler in the composition according to Example 2, as stated before.

Examination of Protective Layers

The structure of a protective layer on a conductive roll was mainly examined for its possible effects on increase or enlargement of picture defects. A conductive roll having a resistance adjusting layer and a protective layer according to each of Examples 5 to 10 below was prepared, and installed in an ordinary electrophotographic apparatus. The apparatus was operated to examine the roll for any enlarged picture defects.

EXAMPLE 5

A roll had its resistance adjusting layer formed from the same composition as that according to Example 4 above. Its protective layer was formed from a fluoroacrylic resin to which graft carbon as described before had been added. Its examination did not reveal any enlarged picture defects.

EXAMPLE 6

A roll had its resistance adjusting layer formed from the same composition as that according to Example 4 above. Its protective layer was formed from a fluoroacrylic resin to which a metal oxide had been added as an electron conductive agent. Its examination revealed some enlarged picture defects.

EXAMPLE 7

A roll had its resistance adjusting layer formed from the same composition as that according to Example 2 above. Its protective layer was formed from a fluoroacrylic resin to which graft carbon as described before had been added. Its examination revealed some enlarged picture defects.

EXAMPLE 8

A roll had its resistance adjusting layer formed from the same composition as that according to Example 2 above. Its protective layer was formed from a fluoroacrylic resin to which a metal oxide had been added as an electron conductive agent. Its examination revealed some enlarged picture defects.

EXAMPLE 9

A roll had its resistance adjusting layer formed from the same composition as that according to Example 1 above. Its protective layer was formed from a fluoroacrylic resin to which graft carbon as described before had been added. Its examination did not reveal any enlarged picture defects.

EXAMPLE 10

A roll had its resistance adjusting layer formed from the same composition as that according to Example 1 above. Its protective layer was formed from a fluoroacrylic resin to which a metal oxide had been added as an electron conductive agent. Its examination revealed some enlarged picture defects.

While the preferred embodiments have been described, variations thereto will occur to those skilled in the art within the scope of the present inventive concepts which are delineated by the following claims.

What is claimed is:

1. A conductive roll sequentially comprising a conductive layer of an elastic material, a resistance adjusting layer, and a protective layer which are formed on an outer periphery of a shaft, said resistance adjusting layer being formed from a composition containing 10 to 150 parts by weight of an electron conductive agent, not more than two parts by weight of an ion conductive agent and 20 to 80 parts by weight of an insulating filler, relative to 100 parts by weight of nitrile rubber, or nitrile rubber hydride as a base material.

2. A conductive roll as set forth in claim 1, wherein said base material is in a foamed form or a solid unfoamed form.

3. A conductive roll as set forth in claim 1, wherein said electron conductive agent is carbon black.

4. A conductive roll as set forth in claim 3, wherein said carbon black has an absorption of dibutylphthalate not more than 50 ml/100 g.

5. A conductive roll as set forth in claim 3, wherein said carbon black is of Grade FT or MT or colored carbon black used for coloring.

6. A conductive roll as set forth in claim 1, wherein said ion conductive agent has a proportion exceeding one part by weight but not more than two parts by weight.

7. A conductive roll as set forth in claim 1, wherein said ion conductive agent is a quaternary ammonium salt.

8. A conductive roll as set forth in claim 7, wherein said salt is trimethyloctadecyl ammonium perchlorate, or benzyltrimethyl ammonium chloride.

9. A conductive roll as set forth in claim 1, wherein said filler has a proportion of 30 to 75 parts by weight.

10. A conductive roll as set forth in claim 1, wherein said filler is a mixture of at least two kinds of differently shaped inorganic substances.

11. A conductive roll as set forth in claim 10, wherein said filler contains said substances in substantially equal proportions.

12. A conductive roll as set forth in claim 1, wherein said protective layer is formed from a material selected from the group consisting of a fluoroacrylic resin, a nylon resin, an acrylic resin, a fluororesin, and a mixture of one or more thereof with another resin.

13. A conductive roll as set forth in claim 12, wherein said protective layer is formed from a fluoroacrylic resin, or a mixture thereof with another resin.

14. A conductive roll as set forth in claim 1, wherein said protective layer contains an electron conductive agent.

15. A conductive roll as set forth in claim 1, wherein said protective layer contains graft carbon obtained by grafting a conductive polymer to the surfaces of carbon black.

16. A conductive roll as set forth in claim 1, wherein said conductive layer is formed from a mixture of the elastic material with a conductive agent.

17. A conductive roll as set forth in claim 16, wherein said elastic material is selected from the group consisting of an ethylene-propylene-diene terpolymer, styrene-butadiene rubber, natural rubber, polynorbornene rubber and a mixture of two or more thereof.

18. A conductive roll as set forth in claim 16, wherein said conductive agent in the conductive layer is carbon black or a metal powder.

19. A conductive roll as set forth in claim 1, wherein said roll is a charge roll for charging a photosensitive drum in a copying machine, or printer.

20. A conductive roll as set forth in claim 1, wherein said conductive layer has a thickness of 1 to 10 mm, said resistance adjusting layer has a thickness of 10 to 700 $\mu$m and said protective layer has a thickness of 3 to 15 $\mu$m.

* * * * *